(12) United States Patent
Merten et al.

(10) Patent No.: US 7,997,402 B2
(45) Date of Patent: Aug. 16, 2011

(54) LINK CHAIN FOR CHAIN CONVEYORS AND CHAIN WHEEL THEREOF

(75) Inventors: Gerhard Merten, Lünen (DE); Hans Meya, Werne (DE)

(73) Assignee: Bucyrus Europe GmbH, Lünen (DE)

( * ) Notice: Subject to any disclaimer, the term of this patent is extended or adjusted under 35 U.S.C. 154(b) by 506 days.

(21) Appl. No.: 12/225,267

(22) PCT Filed: Mar. 24, 2006

(86) PCT No.: PCT/EP2006/002734
§ 371 (c)(1),
(2), (4) Date: Sep. 24, 2008

(87) PCT Pub. No.: WO2007/110088
PCT Pub. Date: Oct. 4, 2007

(65) Prior Publication Data
US 2009/0272632 A1    Nov. 5, 2009

(51) Int. Cl.
*B65G 19/00* (2006.01)
(52) U.S. Cl. .......... 198/728; 198/730
(58) Field of Classification Search .......... 198/717, 198/725, 728, 730, 731, 733
See application file for complete search history.

(56) References Cited

U.S. PATENT DOCUMENTS

| | | | | |
|---|---|---|---|---|
| 3,508,641 A * | 4/1970 | Vagedes | | 198/728 |
| 3,986,602 A * | 10/1976 | Dretzke | | 198/731 |
| 5,931,283 A * | 8/1999 | Meya | | 198/731 |
| 6,655,514 B1 * | 12/2003 | Merten et al. | | 198/731 |
| 6,662,932 B1 * | 12/2003 | O'Neill | | 198/728 |
| 7,159,707 B2 * | 1/2007 | Malitzki et al. | | 198/731 |
| 7,775,342 B2 * | 8/2010 | Merten et al. | | 198/728 |

FOREIGN PATENT DOCUMENTS

| | | |
|---|---|---|
| DE | 1525047 | 4/1970 |
| DE | 4316753 | 11/1994 |
| DE | 19618395 | 5/1997 |
| DE | 19701579 | 6/1998 |
| DE | 19724586 | 11/1998 |
| WO | WO8803906 | 6/1988 |

OTHER PUBLICATIONS

International Search Report PCT/EP2006/002734; Filed Mar. 24, 2006.

* cited by examiner

*Primary Examiner* — James R Bidwell
(74) *Attorney, Agent, or Firm* — Rankin, Hill & Clark LLP

(57) ABSTRACT

The invention relates to a link chain for scraper chain conveyors with vertical chain links which are interlinked in an articulated manner and horizontal chain links, wherein vertical chain links have around the full circumference a constant cross-sectional profile provided on the outside with a flat section and on the inside with a circular arc and horizontal chain links have front sections which have a straight front zone, wherein longitudinal limbs, which connect front sections, of horizontal chain links are provided on their outer faces with a recess. In order to improve the running characteristics of link chain in the event of low surface pressures between chain wheel and horizontal chain links, horizontal chain links have, on both sides in recesses, entrainment means for positive-locking entrainment of scrapers which can be connected to horizontal chain links and/or cross-sectional profile of the vertical chain links is in each case provided with a bevel at the transition of the flat section into the circular arc. The invention also relates to a chain wheel which is suitable for this chain.

20 Claims, 3 Drawing Sheets

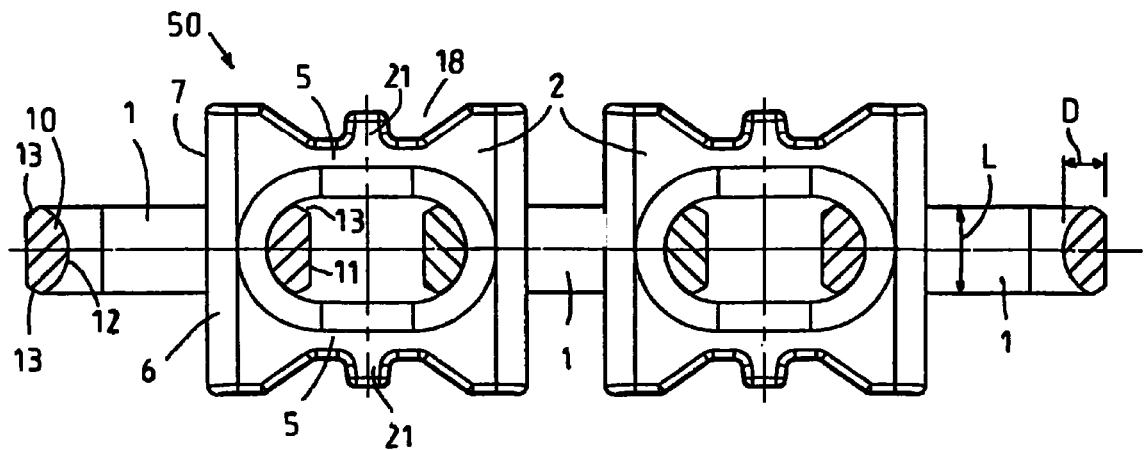
FIG 1
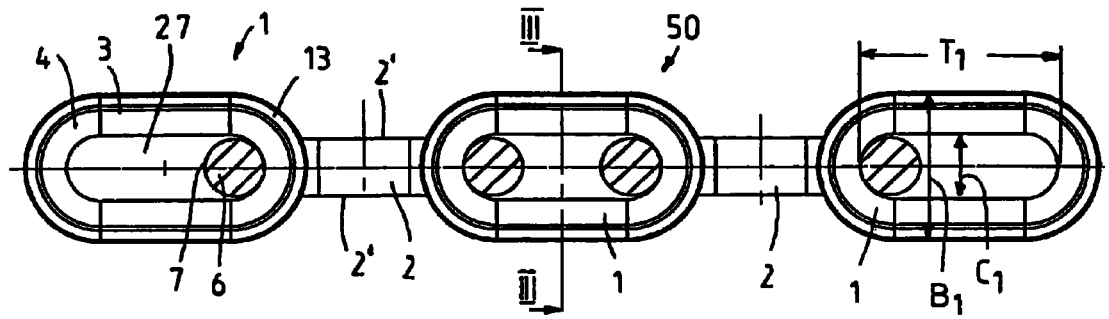
FIG 2
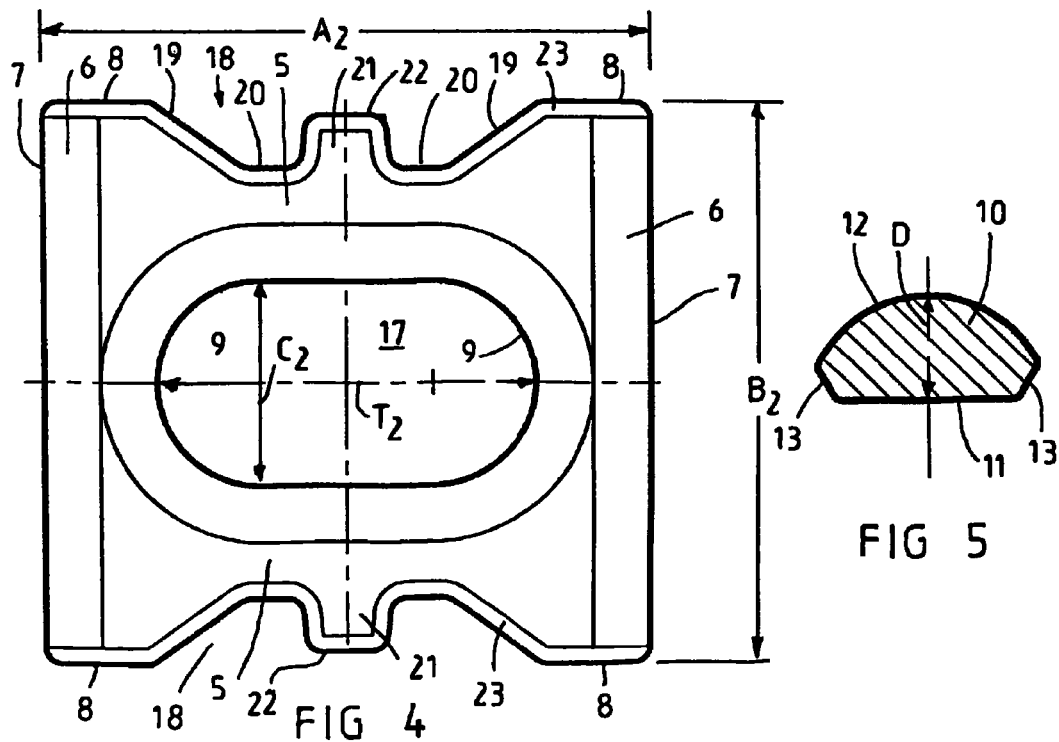
FIG 4
FIG 5

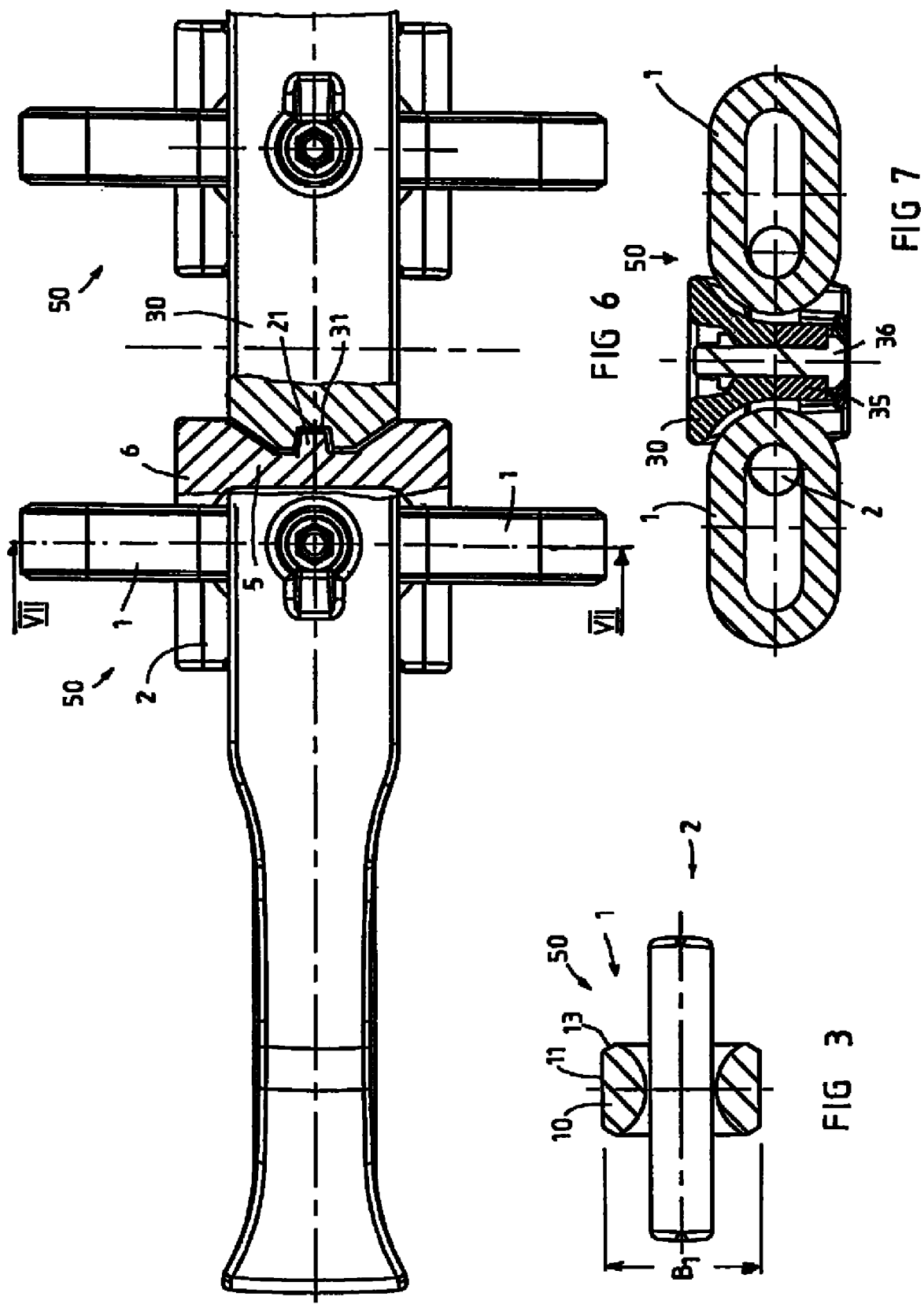

LINK CHAIN FOR CHAIN CONVEYORS AND CHAIN WHEEL THEREOF

This application claims priority from International Application PCT/EP2006/002734 filed on Mar. 24, 2006 which is hereby incorporated by reference herein in its entirety and which forms a part of the specification of this application. In addition, copending International Application PCT/EP2006/002735 filed on Mar. 24, 2006 is hereby incorporated by reference herein in its entirety and also forms a part of the specification of this application.

The invention relates to a link chain for chain conveyors, in particular scraper chain conveyors for use in mining, with vertical chain links which are interlinked in an articulated manner and horizontal chain links, wherein the vertical chain links have around the full circumference a constant cross-sectional profile provided on the outside with a flat section and on the inside with a circular arc and the horizontal chain links have front sections whose outer width is larger than the outer width of the vertical chain links and which have a straight front zone, wherein the longitudinal limbs, which connect the front sections, of the horizontal chain links are provided on their outer faces with a recess. The invention furthermore relates to a chain wheel for a corresponding chain link with at least two rings, which are spaced apart from one another by a gap, of tooth elements arranged such that they are distributed evenly over the circumference of a chain wheel base, wherein flanks facing one another of these tooth elements form pockets for receiving horizontal chain links of the link chain, wherein in each case the gap between two tooth side walls of the tooth elements forms a receiving space for a vertical chain link.

BACKGROUND OF THE INVENTION

A generic link chain is known from DE 197 01 579 A1 to which reference is made to complete the present disclosure and which is indicated in the further prior art relating to link chains. In the case of the generic link chain, due to the large width of the front sections of the horizontal chain links, the linear course of the front side of the front sections and the configuration of the vertical chain links having a significantly smaller outer width with the approximately semi-circular cross-section, the rotational characteristics of the link chain at the driven chain wheel are significantly improved. The surface pressures between the front faces provided with a straight end face perpendicular to the direction of travel of the link chain and the pockets of the chain wheel are significantly reduced in comparison to otherwise conventional horizontal chain links with arcuate front sections or front faces. Since, in each case, the front sections of the horizontal chain links protrude relatively far forward and laterally into the respective pockets of the chain links, even after more significant signs of wear on the pockets of the chain wheel, only slightly increased surface pressures over the initial status are generated since the generally active bearing surface between the front sections of the horizontal chain links and the pockets of the chain wheel is larger than with other chain geometries. The vertical chain links with a semicircular profile are, at the same time, of a small structure and satisfy the required high cross-sectional strengths in order also to be able to withstand the high chain forces which occur in operational use of the link chain. Special horizontal chain links formed as web chain links are used for scraper connection of in particular strap-like scrapers, which horizontal chain links have a bore in their web, which bore is penetrated by a fifth-wheel king pin at the scrapers in order to produce the connection with good tensile and/or shear strength between scrapers on the one hand and the horizontal web chain link on the other hand. The additional web of the web chain links not only increases the manufacturing cost, but rather also the overall weight of the link chain such that a higher driving power overall is required to drive the link chain. Moreover, different horizontal chain links must be produced and connected to one another in a specific sequence in order to form a link chain for scraper chain conveyors.

SUMMARY OF THE INVENTION

In accordance with the present invention, provided is a link chain for chain conveyors and, more particularly, a link chain for scraper chain conveyors for use in mining.

According to one aspect of the invention, provided is a link chain for chain conveyors, in particular scraper chain conveyors for use in mining, the link chain comprising vertical chain links which are interlinked in an articulated manner and horizontal chain links, the vertical chain links having a cross-sectional profile provided on the outside with a flat section and on the inside with a circular arc and with an outer width section, the horizontal chain link having front sections with an outer width that is larger than the outer width of the vertical chain links and which have a straight front zone, the horizontal links further including longitudinal limbs which connect the front sections of the horizontal chain links, the longitudinal limbs including a recess on their outer faces, including an entrainment means for positive-locking entrainment of associated scrapers which are connectable to at least one of the horizontal chain links and the cross-sectional profile of the vertical chain links.

According to another aspect of the invention, provided is a chain wheel for an associated link chain for chain conveyors, in particular scraper chain conveyors for use in mining, the associated link chain including vertical chain links which are interlinked in an articulated manner and horizontal chain links, the vertical chain links having a cross-sectional profile provided on the outside with a flat section and on the inside with a circular arc and with an outer width section, the horizontal chain links having front sections with an outer width that is larger than the outer width of the vertical chain links and which have a straight front zone, the horizontal links further including longitudinal limbs which connect the front sections of the horizontal chain links, the longitudinal limbs including a recess on their outer faces, including an entrainment means for positive-locking entrainment of associated scrapers which are connectable to at least one of the horizontal chain links and the cross-sectional profile of the vertical chain links; said chain wheel comprising at least two rings which are spaced apart from one another by a gap; a plurality of tooth elements arranged such that they are distributed evenly over the circumference of a chain wheel base, each said tooth element including flanks facing one another and at least partially forming pockets for receiving the associated horizontal chain link of the associated link chain, wherein in each case said gap between two tooth side walls of said tooth elements forms a receiving space for the associated vertical chain link of the associated link chain, said tooth side walls delimiting said gap are provided with a bevel at the transition to the circumferential wall surface of said tooth elements.

An object of the invention is to create a high-strength link chain for use in particular in the case of scraper chain conveyors which can even be easily used in the case of large lengths of several hundred meters without being dimensioned overproportionally in terms of their height and in terms of their weight and which are also characterized by good load and running characteristics of the horizontal and vertical chain links with one another and during passing through of the chain wheel, and which also enables good mounting of scrapers and entrainment of the mounted scrapers.

According to a further aspect of the invention, the link chain includes a horizontal chain link wherein the horizontal chain links have, on both sides in the recesses, entrainment means for positive-locking entrainment of scrapers which can be connected to the horizontal chain links and/or the cross-sectional profile of the vertical chain links is in each case provided with a bevel at the transition of the flat section into the circular arc. As a result of the entrainment means formed according to the invention in the recesses, extremely good entrainment characteristics are achieved for the scrapers connected to these horizontal chain links without it being necessary to produce special chain links, in particular web chain links, and enclosing them in the link chain at a specific position. The straight face side present in the case of the horizontal chain links at the front sections enables significantly smaller surface pressures between the front faces of the horizontal chain links and a chain wheel in comparison to other chain link geometries even if the bearing surface available for bearing is smaller than in the starting status due to signs of wear on the pockets of the chain wheel. The vertical chain links with the flat profiling forming in a rotary manner across its circumference, the circular arc-shaped camber on the inner surface facing the inner opening and the bevels at the transition of the flat section to the circular arc bring about significantly improved running characteristics of the link chain overall despite the still possible low overall height of the link chain since, as a result of the bevels at the transition to the outside of the vertical chain links, their angling capacity to the horizontal chain links in the interlinked state is improved. The bevels on the vertical chain links also enable that the link chain is overall better adjusted at the chain wheel to the pockets for the horizontal chain links and the gaps for the vertical chain links since the bevels can assume a threading function for the vertical chain links at the tooth gaps. The cooperation of the innovations according to the invention on the horizontal chain links and on the vertical chain links significantly improves the running characteristics and wear characteristics of a link chain according to the invention. However, both measures are also of independent inventive importance.

According to another aspect of the invention, the bevel on the horizontal chain links runs relative to the flat section at an angle of approximately 60°±2°. It is furthermore advantageous if the cross-sectional profile of the vertical chain links has a width to thickness ratio of width L to thickness D of L/D≧2. The corresponding cross-sectional profile enables very flat-design vertical chain links which simultaneously possess a sufficient cross-sectional surface to be able to withstand the large forces during operation of the link chain. At the same time, the vertical chain links can furthermore be produced relatively simply and cheaply from rolled profile rods with correspondingly larger diameters for the high power requirement of a conveyor of e.g. 42 mm in the usual welded design. In the case of the link chain according to the invention, the clear inner width of the inner openings of the horizontal chain links is preferably significantly larger than the clear inner width of the vertical chain links.

According to yet another aspect of the invention, the entrainment means are formed centrally between both front sections such that overall a symmetrical horizontal chain link is created which has no preferred direction during installation in a link chain and during operation. In the case of one embodiment, each entrainment means protrudes into associated recess on the side flanks of the otherwise approximately rectangular horizontal chain links in a projecting manner such that no weakening of the longitudinal limbs of the horizontal chain links and thus no weakening of the supporting profile cross-section of the horizontal chain links can occur as a result of the entrainment means. The entrainment means can in particular comprise a projecting web which extends over the entire depth of the longitudinal limbs of the horizontal chain links such that the entrainment means then have an even and large active surface in cooperation with scrapers fixed thereon. In operational use, the entrainment means bring about that the scrapers are moved in a pushing manner with the link chain, wherein the two-sided support of the scrapers by the entrainment means formed on both sides generates an even entrainment behavior of the scrapers. It is particularly advantageous if the entrainment means is an entrainment nose formed on the longitudinal limb with a preferably trapezoidal cross-section.

According to a further embodiment, the free end faces of the entrainment means can have a shorter distance from one another than the outer width of the front sections such that the entrainment means of horizontal chain links to which no scraper is connected in operational use lie in the direction of movement in the protected region behind the outer corners of the straight front sections of the horizontal chain links. In one embodiment of the horizontal chain links, the origin of the recesses on the front sections is spaced apart from the straight front zones of the front sections and/or a preferably straight intermediate portion is formed between the origin and the front zone. As a result of these measures, the front corner regions of the front sections are additionally reinforced over the known configuration of the horizontal chain links and the risk of excess wear on the lateral delimiting faces of the front sections is minimized. Moreover, as a result of this shaping, the active bearing face of the horizontal chain links on the pockets of the chain wheel increases again and the surface pressures in operational use are further reduced. Moreover, the recesses can preferably have two flanks beveled in a straight line which preferably enclose an angle of approximately 110°±4°. The recesses are thus significantly more pronounced in the case of the horizontal chain links according to the invention than in the case of those known from the prior art, as a result of which the available bearing surface between the horizontal chain links and the scrapers connected to these is simultaneously increased. It is advantageous if a base section which is straight up to the projecting entrainment means is formed in the region of the recesses between the flanks.

The longitudinal limbs of the horizontal chain links can have rounded edges at the transition of the outside to the upper and lower sides of the horizontal chain links. Moreover, the front sections can have a circular wire cross-section in the central plane of the horizontal chain links, which cross-section then changes correspondingly towards the outer surfaces of the front sections and increases in size and subsequently forms a transition in one piece to the longitudinal limbs connecting both front sections. The horizontal chain links can in particular comprise cast chain links.

The feed characteristics of the link chain according to yet another aspect of the invention is provided wherein in the case of a chain wheel, the tooth side walls delimiting the gap are likewise provided with a bevel at the transition to the circumferential wall surface of the tooth elements. The bevels on the tooth side walls can cooperate particularly advantageously with the bevels on the vertical chain links and significantly improve the threading of the vertical chain links into the gaps and thus also of the following horizontal chain links into the respective pockets. It is apparent that, in the case of a chain wheel, several toothed rings, in particular three toothed rings, can be present next to one another, of which one central toothed ring is formed as a double tooth element in order to be able to drive and move a double center chain with the chain wheel. It is also advantageous in the case of the chain wheel according to the invention if the bevels run relative to the circumferential wall surface at an angle of approximately 60°±2°. Moreover, the distance between the tooth side walls of adjacent rings can increase continuously from the chain wheel base to the circumferential face or to the origin of the bevel at the tooth elements in order to further improve the feed characteristics of the vertical chain links into the tooth gaps.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein:

FIG. 1 shows a short length section of a link chain according to the invention in a top view, wherein the vertical chain links are shown in a horizontal section;

FIG. 2 shows the link chain according to FIG. 1 in a sectional view rotated around 90° with the vertical chain links in a side view and the horizontal chain links in a sectional view through its longitudinal central plane;

FIG. 3 shows a sectional view along III-III in FIG. 2;

FIG. 4 shows an individual horizontal chain link in a top view;

FIG. 5 shows the cross-sectional profile of the vertical chain links in an enlarged view;

FIG. 6 shows, in a top view, partially broken up, a scraper wing connected to horizontal chain links of a double center chain;

FIG. 7 shows a sectional view along VII-VII in FIG. 6;

DETAILED DESCRIPTION OF THE INVENTION

Figure 9:
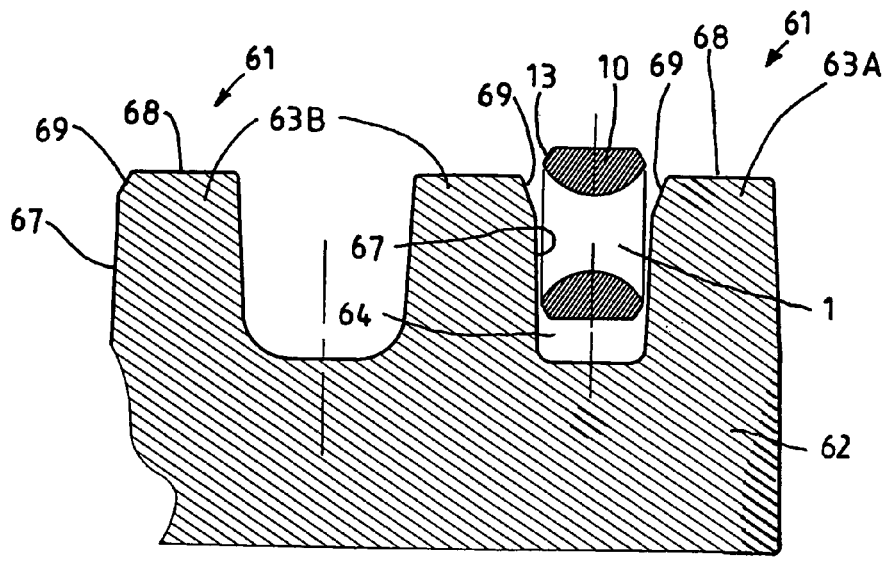
FIG. 9 schematically shows a vertical chain link in the gap between two tooth elements, shown in section, of a chain wheel according to the invention.

Referring now to the drawings wherein the showings are for the purpose of illustrating preferred and alternative embodiments of the invention only and not for the purpose of limiting same, link chain 50 shown in FIGS. 1 to 3 for chain conveyors, in particular for scraper chain conveyors as face conveyors in underground mining use, substantially comprises vertical chain links 1, which are interlinked in an articulated manner, and horizontal chain links 2 connecting these to one another in a movable articulated manner. Both chain links 1 which are vertical or standing in operational use and horizontal or lying chain links 2 are in each case formed as eyelet-like chain links with longitudinal limbs 3 and chain fronts 4 in the case of vertical chain links or longitudinal limbs 5 and front sections 6 in the case of horizontal chain links 2. Vertical chain links 1 and horizontal chain links 2 are formed differently in terms of their shape and their dimensions and horizontal chain links 2 comprise one-part or one-piece cast parts, while vertical chain links 1 are formed from a profile wire with a special profile wire cross-section 10 which is reshaped into the eyelet-like shape of vertical chain links 1 and then, after linking into horizontal chain links 2, is connected to closed eyelet-like vertical chain links 1 by welding of longitudinal limbs 3 or front sections 4.

Vertical chain links 1 obtain, in particular as a result of their special profile cross-section 10, an overall flat shape, wherein profile cross-section 10 is formed constantly around the full circumference on vertical chain links 1. Profile cross-section of vertical chain links 1 is shown in an enlarged view in FIG. 5 to which reference is now additionally made. Profile cross-section 10 extends around the full circumference across front sections 4 and longitudinal limbs 3 of vertical chain links 1 and in each case encompasses a flat section 11 forming the outside of vertical chain links 1 and an inside facing in each case around the full circumference eye-like inner opening 27 of vertical chain links 1, which inside forms a partial section of a circular arc 12 in the profile cross-section. The surface of circular base 12 therefore has a generating radius preferably lying outside the profile cross-section which corresponds to a radius of approximately 35 mm in the case of the preferred chain size for the vertical chain links. In contrast to a complete, semicircular cross-sectional profile, in the case of cross-sectional profile 10 according to the invention of vertical chain links 1, a very pronounced bevel 13 is provided in each case at the transition of circular arc 12 to flat section 11, wherein bevel 13 also extends around the full circumference across chain fronts 4 and longitudinal limbs 3 of vertical chain links 1 and runs at an angle relative to flat section 11 at an angle of preferably 60°±2°. In the case of a cross-sectional profile 10 for vertical chain links which corresponds to that of a 42 mm chain in terms of the forces it can withstand, the ratio of width L of vertical chain links 1 to their thickness D can be approximately 62 mm: 30 mm (i.e. $\geq 2$), wherein bevels 13 extend across approximately a third of thickness D of cross-sectional profile 10 of vertical chain links 1. Bevels 13 formed on both sides around the full circumference ensure a significant improvement in the mobility of vertical chain links 1 interlinked into inner openings 17 of horizontal chain links 2 and also improve the threading of vertical chain links 1 and thus of link chain 50 according to the invention in general into a chain wheel for driving link chain 50, as explained further below.

In contrast to vertical chain links 1 with a constant cross-section around the full circumference, horizontal chain links 2 comprise cast chain links with front parts 6 formed identically to one another and longitudinal limbs 5 formed identically to one another; however, the circumferential cross-sectional profile changes approximately continuously. The structure of horizontal chain links 2 will now be explained with reference to FIG. 1 to 4. As is particularly apparent from FIG. 4, horizontal chain links 2 have an almost rectangular basic shape with two front sections 6 whose front or rear front faces 7, wherein front or rear in each case relates to the direction of travel of a link chain, run in a straight line across the entire outer width $B_2$ of front sections 6 and thus of horizontal chain links 2. In this case, front face 7 runs in a substantially circular arc shape between the underside or upper side 2' of horizontal chain links 2 and front sections 6 have a circular cross-section in the longitudinal central plane as shown in the sectional view in FIG. 2, said cross-section corresponding to the initial wire width of the cast chain links of preferably 42 mm. Straight front sides 7 of front sections 6 form a transition at the corners or outsides at an angle about 90° into straight intermediate sections 8 on the outside which form the lateral delimitations of front sections 6 and adjoin in each case longitudinal limbs 5 of horizontal chain link 2. Straight sections 8 extend in each case across approximately 19% of the entire length $A_2$ of horizontal chain links 2 and both intermediate sections 8 end substantially at the same height as semicircular delimiting faces 9 of inner opening 17 of horizontal chain links 2. The end of intermediate section 8 simultaneously forms the origin of a recess 18 on the outside of both longitudinal limbs 5 which are formed by means of in each case two flanks 19 which are beveled in a straight line and one in turn straight base section 20 which runs perpendicular to face side 7. Nevertheless, base sections 20 form in each case a transition into the side flanks of an entrainment nose 21 protruding in a projecting manner into recess 18 and formed centrally of longitudinal limbs 5. Entrainment nose 21 has, in a top view, an approximately trapezoidal cross-section and lies centrally between both straight front sides 7 of horizontal chain link 2. Entrainment nose 21 extends substantially web-shaped from the upper to lower side of horizontal chain links 2 and free end faces 22 of entrainment nose 21 have a slightly shorter distance than outer width $B_2$ of horizontal chain links 2 on front sections 6. In the case of the preferred configuration of a horizontal chain link 2, the distance between free front faces 22 is approximately 5% smaller than maximum outer width $B_2$. The length of recess 18 approximately corresponds to division $T_2$ of chain links 2 which is 140 mm in the preferred configuration and entrainment nose 21 extends across a width which is approximately 21% of the length of recess 18. The radius of curvature of circular arc-shaped delimitations 9 of inner opening 17 corresponds to the radius of curvature of inside 13 of vertical chain links 1 and clear inner width $C_2$ of inner opening 17 of horizontal chain links 2 is preferably approximately 18% larger than width L of cross-sectional profile 10 of vertical chain links 1. Both flanks 19 of recesses 18 preferably enclose an angle of approximately 110° and are correspondingly unwound by approximately 35° to intermediate sections 8. Base sections 20 on opposing longitudinal limbs 5 can in each case have a distance to one another which is approximately 24% smaller than maximum outer width $B_2$ of front sections 6. Both longitudinal limbs 5 and intermediate sections 8 form a transition via a slightly rounded edge 23 in each case into the upper and lower sides of horizontal chain links 2.

In the case of vertical chain links 1, division $T_1$ corresponds to division $T_2$ of horizontal chain links 2, nevertheless both outer width $B_1$ and clear inner width $C_1$ are significantly smaller than in the case of the vertical chain links 1. Ratio $C_2/C_1$ is preferably 76 mm/48 mm, i.e. approximately 1.6 and ratio $B_2/B_1$ is preferably 210 mm/108 mm, i.e. approximately 1.95.

As is particularly apparent from FIG. 1, bevels 13 ensure good articulated mobility of vertical chain links 1 into inner openings 17 of horizontal chain links 2 at the transition to the flat sections on the outside of vertical chain links 1 such that there is improved articulated play there and thus lower susceptibility to wear.

FIGS. 6 and 7 show a section of link chain 50 with vertical chain links 1 and a horizontal chain link 2 to which a scraper 30 extending across the entire width of a conveying groove is connected. For the transport of scrapers 30, two link chains 50 of an identical structure are provided which therefore form a double center chain. From the broken up view in FIG. 6, it is clearly apparent how entrainment nose 21 on longitudinal limbs 5 of horizontal chain links 2 engage with an associated groove 31 in scraper 30 in a positive-locking manner in order to entrain scrapers 30 in a pushing manner in the direction of conveyance or direction of travel of link chains 50. To this end, horizontal chain links 2 are inserted into recesses, not shown, from the underside of scrapers 30 such that entrainment noses 21 enclose on both sides into corresponding grooves 31. A scraper securing member 35 is subsequently inserted from below, member 35 being detachably screwed by means of a screw 36 to wing-like scraper 30 in order to be able to mount or remove scrapers 30.

Figure 8:
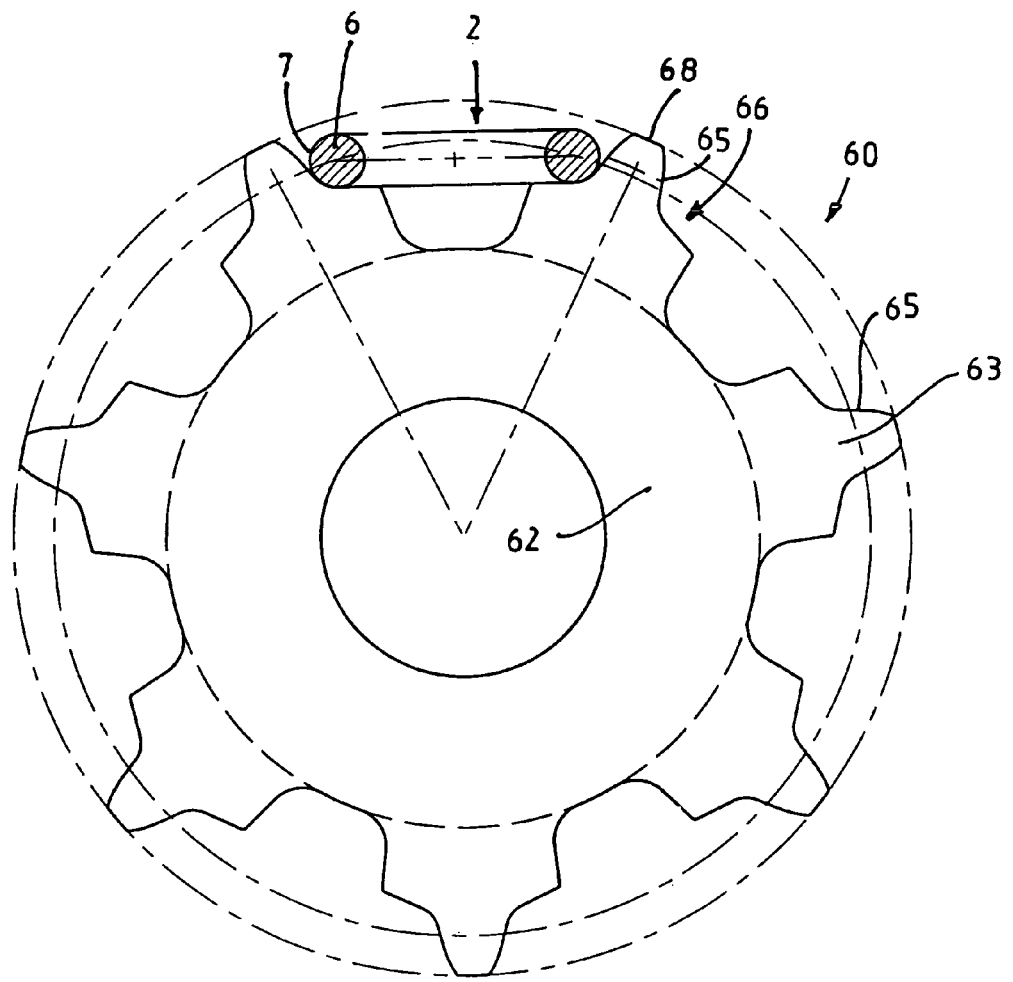
FIG. 8 shows, in a lateral view, a chain wheel with a horizontal chain link engaging with the pockets of a toothed ring.

FIGS. 8 and 9 show a chain wheel 60 which can preferably be used for a link chain 50 according to the invention and which, in one configuration for a double center chain, is provided with four rings 61 lying next to one another of in total seven tooth elements 63 arranged in a manner distributed evenly over the circumference of chain wheel base 62. As FIG. 9 in particular shows, two toothed rings 61 which lie next to one another encompass a tooth element 63A or a tooth element 63B spaced apart in each case by a gap 64, wherein both tooth elements 63A, 63B are shown only for both right toothed rings 61. Pockets 66, on which horizontal chain links 2, as schematically shown in FIG. 8, bear both in the circumferential direction and in the radial direction, in order to drive a link chain by pushing entrainment of horizontal chain links 2 deflected at chain edge 60, are formed with flanks 65, which face one another, of tooth elements 63A, 63B. It is clearly apparent from the side view in FIG. 8 that, as a result of the straight configuration of front sides 7 of front sections 6 of horizontal chain links 2, a large surface bearing of horizontal chain links 2 is achieved in particular in the radial direction at pockets 66 of tooth elements 63 which is significantly higher at the pockets even in the case of signs of wear than in the case of horizontal chain links 2 with a round front side.

Tooth side walls 67 facing one another of tooth elements 63A, 63B, with which gaps 64 are laterally delimited, in turn have a bevel 69 which preferably runs at an angle of 60°±2° relative to circumferential wall face 68 at the transition to circumferential wall face 68 of tooth elements 63A, 63B. As a result of the cooperation of bevels 69 on tooth elements 63A, 63B with bevels 13 on vertical chain links 1, particularly good guidance and thus particularly low-wear threading of vertical chain links 1 and thus of the entire link chain into chain wheel 60 is brought about. The distance between opposing tooth side walls 67 increases from chain wheel base 62 to circumferential wall faces 68 preferably continuously at an angle of in particular 6°.

Numerous modifications which should fall within the scope of protection of the attached claims are apparent to the person skilled in the art from the above description. The indicated dimensions only represent the preferred dimensions for the vertical and horizontal chain links. The dimensions of the entrainment noses in the recesses can also vary without departing from the scope of protection of the claims.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. These combinations include, but are not limited to, combining a tank with an inner vessel arrangement. Accordingly, it is to be distinctly understood that the foregoing descriptive matter is to be interpreted merely as illustrative of the invention and not as a limitation.

The invention claimed is:

1. A link chain for chain conveyors, in particular scraper chain conveyors for use in mining, said link chain comprising vertical chain links which are interlinked in an articulated manner and horizontal chain links, said vertical chain links having a cross-sectional profile provided on the outside with a flat section and and on the inside with a circular arc and with an outer width section, said horizontal chain links having front sections with an outer width that is larger than said outer width of said vertical chain links and which have a straight front zone, said horizontal links further including longitudinal limbs which connect said front sections of said horizontal chain links, said longitudinal limbs including a recess on their outer faces, including an entrainment means for positive-locking entrainment of associated scrapers which are connectable to at least one of said horizontal chain links and said cross-sectional profile of said vertical chain links.

2. The link chain according to claim 1, wherein said cross-sectional profile of said vertical chain links further includes a bevel at the transition of the flat section into the circular arc.

3. The link chain according to claim 2, wherein said bevel runs relative to said flat section at an angle of 60°±2°.

4. The link chain according to claim 1, wherein said cross-sectional profile of said vertical chain links has a width to thickness ratio L/D≧2.

5. The link chain according to claim 2, wherein said cross-sectional profile of said vertical chain link is a constant cross-sectional configuration substantially around the full circumference of said vertical link.

6. The link chain according to claim 1, wherein said entrainment means are formed centrally between both said front sections.

7. The link chain according to claim 1, wherein each said entrainment means includes a protrusion extending from said recess in a projecting manner.

8. The link chain according to claim 7, wherein said each entrainment means further includes a projecting web which extends over the entire depth of the longitudinal limbs of said horizontal chain links.

9. The link chain according to claim 7, wherein said each entrainment means includes an entrainment nose formed on said longitudinal limb with a trapezoidal cross-sectional configuration.

10. The link chain according to claim 7, wherein said protrusions include end faces and said end faces have a shorter distance from one another than said outer width of said front sections.

11. The link chain according to claim 1, wherein said recesses is spaced from said straight front zones.

12. The link chain according to claim 11, wherein said spacing of said recess is formed by a straight intermediate portion.

13. The link chain according to claim 12, wherein said recesses have two flanks beveled in a straight line at an angle of 110°±4° from said straight intermediate portion.

14. The link chain according to claim 13, wherein said recesses further include a base section which is straight up to said projecting entrainment means and is formed between said flanks.

15. The link chain according to claim 1, wherein said longitudinal limbs of said horizontal chain links have rounded edges at the transition of the outside to the upper and lower sides.

16. The link chain according to claim 1, wherein said front sections have a circular wire cross-section in a central plane of said horizontal chain links.

17. A chain wheel for an associated link chain for chain conveyors, in particular scraper chain conveyors for use in mining, the associated link chain including vertical chain links which are interlinked in an articulated manner and horizontal chain links, the vertical chain links having a cross-sectional profile provided on the outside with a flat section and on the inside with a circular arc and with an outer width section, the horizontal chain links having front sections with an outer width that is larger than the outer width of the vertical chain links and which have a straight front zone, the horizontal links further including longitudinal limbs which connect the front sections of the horizontal chain links, the longitudinal limbs including a recess on their outer faces, including an entrainment means for positive-locking entrainment of associated scrapers which are connectable to at least one of the horizontal chain links and the cross-sectional profile of the vertical chain links; said chain wheel comprising at least two rings which are spaced apart from one another by a gap; a plurality of tooth elements arranged such that they are distributed evenly over the circumference of a chain wheel base, each said tooth element including flanks facing one another and at least partially forming pockets for receiving the associated horizontal chain link of the associated link chain, wherein in each case said gap between two tooth side walls of said tooth elements forms a receiving space for the associated vertical chain link of the associated link chain, said tooth side walls delimiting said gap are provided with a bevel at the transition to the circumferential wall surface of said tooth elements.

18. The chain wheel according to claim 17, wherein said bevels run relative to said circumferential wall surface at an angle of approximately 60°±2°.

19. The chain wheel according to claim 17, wherein the distance between said tooth side walls of adjacent rings increases preferably continuously from said chain wheel base to said circumferential face.

20. The chain wheel according to claim 17, wherein the distance between said tooth side walls of adjacent rings increases preferably continuously from said chain wheel base to the origin of said bevel.

\* \* \* \* \*